3,127,511
PRODUCTIVITY WELL LOGGING BY ACTIVATION ANALYSIS AND FLUID WITHDRAWAL
Hugh E. Hall, Jr., Houston, Tex., assignor to Texaco Inc., New York, N.Y., a corporation of Delaware
Filed Jan. 25, 1960, Ser. No. 4,361
4 Claims. (Cl. 250—43.5)

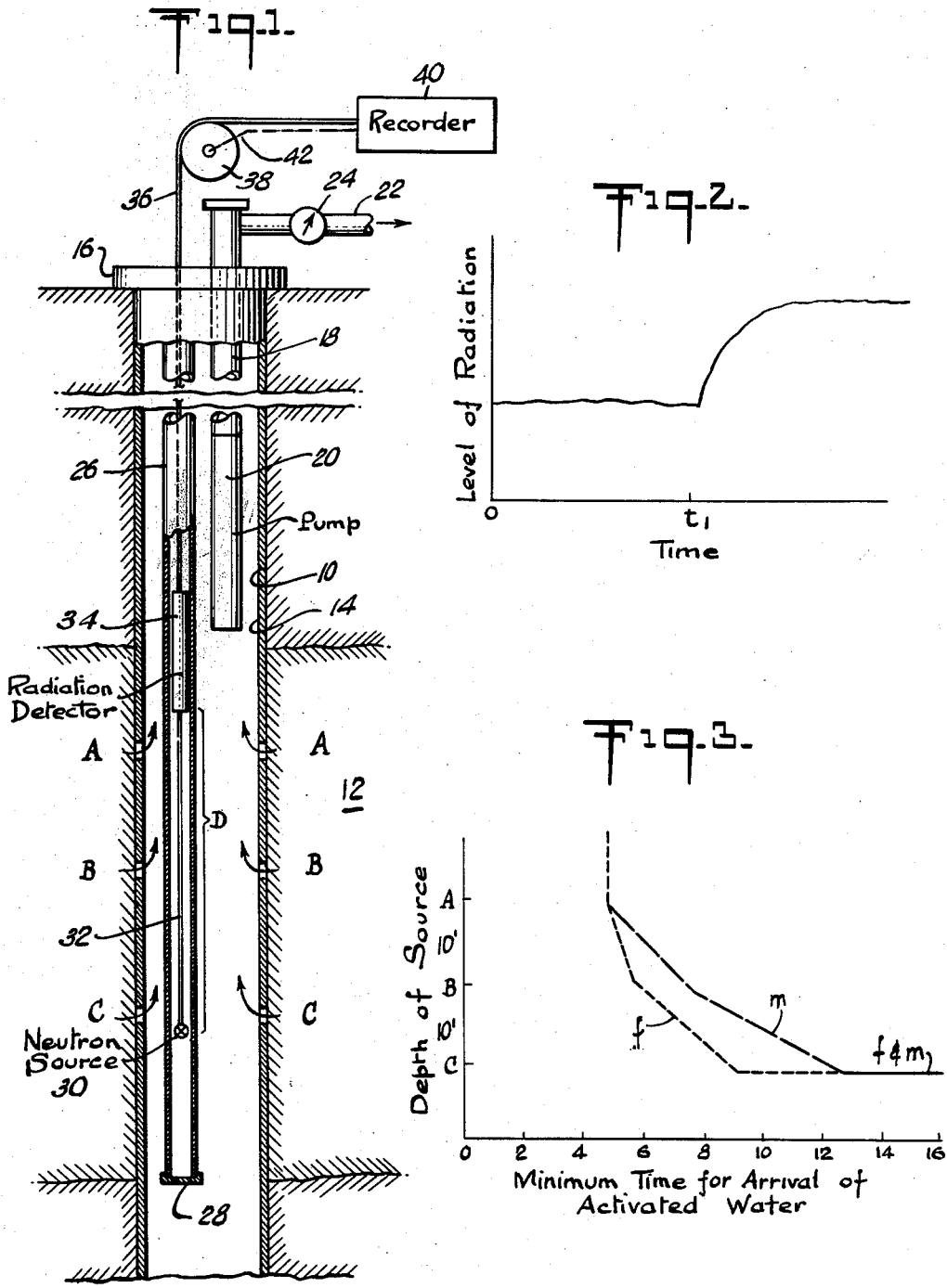

This invention relates to a method of studying earth formations and, more particularly, to an improved method of obtaining a productivity profile log of subsurface formations traversed by a borehole, that is, a method of determining the vertical distribution of fluid flow from different formations or different vertical intervals of a formation into a borehole.

In many instances in the production of an oil formation with a water drive, the water often enters into the oil producing well. When high water production is encountered in an oil producing well, it is desirable to pack off the zone or zones in the borehole from which the water is being produced.

In accordance with this invention an improved method is provided for locating the point or points of entry of the water into the borehole. In one aspect of the present invention the chlorine in the salt water which is entering into the producing well is activated with thermal neutrons at one location in the borehole and the resulting activation measured at a given distance in the borehole at some later time. Knowing the distance of travel of the activated chlorine and the time of travel of the activated chlorine for the known distance, the velocity of the activated chlorine may be determined. By determining the velocity of the fluid movement at a plurality of given intervals over the producing interval, the amount of water flowing into the borehole at one or more points may be determined.

For a better understanding of the invention reference may be had to the accompanying drawing in which:

FIG. 1 is a vertical sectional view taken through a borehole traversing a producing formation or zone showing apparatus associated therewith for carrying out the present invention;

FIG. 2 is a graph indicating radiation level plotted against time; and

FIG. 3 is a graph indicating depth of radiation source plotted against the minimum time for arrival of activated water.

Referring to the drawing, and particularly to FIG. 1, there is shown a borehole 10 traversing a producing formation 12 from which a fluid such as water or oil is flowing into the borehole 10. The borehole 10 is lined with a casing 14 which is perforated at three depths A, B and C and is closed at the earth's surface by a casing head 16. A string of production tubing 18 passing through the casing head 16 extends downwardly into the borehole 10 to a pump 20 which is attached to the lower end thereof and disposed at a point in the borehole 10 above the uppermost perforations A. The pump 20 may be of any suitable conventional type which may be actuated by means of a prime mover and sucker rods (not shown). Disposed within an outlet pipe 22 coupled to the upper end of the production tubing 18 is a flow meter 24 for measuring the fluid pumped out of the borehole. The borehole 10 also contains a second string of tubing 26 which is used for guiding the logging equipment past the pump 20. The logging tubing 26 may be provided with a cap or plug 28 which is particularly useful for logging in high pressure wells, as disclosed more fully in a commonly assigned copending U.S. application Serial No. 811,727, filed on May 7, 1959 by J. C. Allen and H. E. Hall, Jr. A neutron source 30 emitting thermal neutrons which activate the chlorine in any salt water present in the borehole 10 is suspended in the logging tubing 26 by any suitable means 32, for example, an elongated flexible member, connected to the lower end of a suitable conventional radiation detector 34, for example, a gamma counter such as a Geiger or scintillation counter, at a known distance D from the radiation detector 34. The radiation detector 34 and the source 30 are supported in the logging tubing 26 by a logging cable 36 which engages a depth measuring device 38 located at the earth's surface and which is connected at its upper end to a recorder 40 which may include suitable signal amplifiers. Coupling means 42 connect the recorder 40 to the depth measuring device 38.

In order to more clearly understand the operation of the invention, let it be assumed that the fluids entering into the borehole 10 at perforations A, B and C are being pumped out of the borehole by pump 20, that the cross-sectional area of the annular space within the casing 14 in the vicinity of the perforations A, B and C is one square foot, that the distance D between the source 30 and the detector 34 is 30 feet, that the liquid being produced is primarily water, that the perforations A, B and C are displaced 10 feet from one another, and that the pump 20 is more than 30 feet above point A.

The point or points of entry of salt water flowing into the borehole 10 are located by lowering the source 30 and the detector 34 into the borehole 10 until the source 30 is at a point below the lowest perforations C. After the activated water or chlorine passes up the casing 14 the source 30 is placed above the uppermost perforations A and the time $t_1$ required for the activated chlorine to travel the distance D between the source 30 and the detector 34 is noted, for example, as illustrated in the graph of FIG. 2 of the drawing. The velocity of the fluid in the annulus above the perforations A is $D/t_1 = V_1$. The source 30 is again lowered to a point below the perforations C and held there until the activated water passes up the casing 14 out of the vicinity of the perforations A, B and C. The source 30 is now placed between the perforations A and B. If, after a time which is much greater than $t_1$, there is no evidence of any activation, all of the produced water is entering into the borehole 10 through perforations A. If there is activation and $t_2 = t_1$ then all the produced water is entering into the borehole 10 through perforations B or C or through both B and C. A time measurement may again be made in a similar manner with the source 30 located between B and C to determine whether water is entering into the borehole 10 through perforations C.

The amount of water flowing into the borehole 10 at each of the perforation levels A, B and C can be determined by noting the time of travel of the activated chlorine for the distance D between the source 30 and the detector 34. If the travel time $t_1$ of the activated chlorine with the source 30 above perforations A for the distance D is 5 minutes, the velocity of fluid flow above perforations A is $$V_1 = \frac{D}{t_1} = \frac{30}{5} = 6 \text{ feet per minute}$$

If the travel time $t_2$ of the activated chlorine with the source 30 at perforations B for the distance D is 5.8 minutes, the velocity of the fluid flowing from perforations B to perforations A is $$V_2 = \frac{30-20}{5.8-3.3} = 4 \text{ feet per minute}$$

If the travel time $t_3$ of the activated chlorine with the source 30 at perforations C for the distance D is 9.1 minutes, the velocity of the fluid flowing from perforations C to perforations B is $$V_3 = \frac{30-10-10}{9.1-1.66-2.5} = 2 \text{ feet per minute}$$

A graph showing the minimum time for arrival of activated water traveling the fixed distance of 30 feet plotted against the depth of the source 30 can be seen at curve $f$ of FIG. 3.

Knowing the velocity of the fluid at any point in the borehole, the amount of water entering into the borehole 10 above that point can be dettrmined by the equation $$\frac{V \text{ above perforations} - V \text{ at point}}{V \text{ above perforations}} \times 100$$

= percent of water entering above the point in question

Therefore, above perforations B the amount of water entering into the borehole 10 is $$\frac{6-4}{6} \times 100 = 33\frac{1}{3}\%$$

or two cubic feet per minute and above perforations C the amount of water entering into the borehole 10 is $$\frac{6-2}{6} \times 100 = 66\frac{2}{3}\%$$

or four cubic feet per minute. Thus, two cubic feet per minute of water is flowing into the borehole 10 at each of the three depths A, B and C.

In another embodiment of the invention the detector 34 may be held stationary while the source 30 is moved to different locations. For example, the detector 34 may be held stationary in the borehole 10 at a point 30 feet above the perforations A while the source 30 is moved between perforations A and a point below perforations C to provide the necessary data for producing the results of the present invention. A plot of the depth of the source 30 against the minimum time for arrival of activated water when the detector 34 is held at a fixed location 30 feet above the perforations A is shown by curve $m$ in FIG. 3 of the drawing.

The radiation source 30 may conveniently be a pulsed source such as an accelerator or even radium Ra, or a suitable isotope, inside of beryllium Be. The distance or spacing D could be greatly reduced and the differential velocities measured. A substantial neutron source is required but a commercially available polonium beryllium source could be used. It is known that $Cl^{37}$ may be activated with a 38 minute half life using a 250 millicurie radium-beryllium neutron source. The slower the borehole fluid flow rates, the smaller the source required. Since $Cl^{38}$ emits a 1.6 and a 2.1 m.e.v. gamma ray, a scintillation tool biased at approximately 1.2 m.e.v. could be used in order to eliminate soft natural gamma radioactivity in the borehole.

If there is substantial oil production in the borehole, it is necessary to determine the origin of the oil. This may be readily accomplished by employing a suitable known method, such as the method disclosed in the above-mentioned copending Allen and Hall application. The velocities of the activated water would be corrected to the extent that the oil decreases the cross-sectional area through which the salt water flows and thus increases the velocity.

Although the invention has been descrbied primarily in connection with salt water production in oil wells, it should be understood that the invention may be useful in other similar applications.

Obviously, many modifications and variations of the invention as hereinbefore set forth may be made without departing from the spirit and scope thereof, and, therefore, only such limitations should be imposed as are indicated in the appended claims.

I claim:

1. A method of making a productivity profile log of a borehole which comprises withdrawing fluid from the borehole at a known flow rate, activating a constituent of the fluid entering from the formation surrounding said borehole, said activation being carried out at a given location in the borehole, detecting the arrival of said activated constituent downstream from said given location, and timing said arrival to determine the velocity of said constituent and the amount of constituent upstream from said given location.

2. A method of making a productivity profie log of a borehole into which salt water is flowing from subsurface formations which comprises withdrawing fluid from the borehole at a constant flow rate, activating the chlorine in the salt water at a first location, detecting the presence of the activated chlorine at a second location spaced a known distance from the first location, timing the travel of the activated chlorine between said first and second locations, repeating said last three steps at other depths, in order to determine the velocities of the activated chlorine at each of said first locations, and to determine from the velocities the amount of water flowing into the borehole at points above each of said first locations.

3. A method of making a productivity profile log of a borehole into which salt water is flowing from at least one of a plurality of vertically spaced points in the borehole which comprises discharging the fluid from the borehole at a constant flow rate, activating the chlorine in the salt water passing the uppermost point of said spaced points at a first location, detecting the presence of the activated chlorine at a second location spaced a known distance above the first location, timing the travel of the activated chlorine between said first and second locations, repeating said last three steps with the chlorine being activated at each of the points of said plurality of spaced points below the uppermost point, in order to determine the velocity of the water for each interval between adjacent points of said spaced points and to determine from the velocities the amount of fluid flowing into the borehole from each of said plurality of vertically spaced points.

4. A method of making a productivity profile log of a borehole into which salt water is flowing from at least one of a plurality of vertically spaced points in a zone of the borehole of a known cross-sectional area which comprises pumping borehole fluid out of the borehole at a constant rate, placing a source of thermal neutrons at a first location for activating the chlorine in the salt water passing the source, detecting changes in radiation at a second location spaced a known distance above the first location to determine the presence of the activated chlorine at the second location, timing the travel of the activated chlorine between said first and second locations, repeating the last three steps at other known depths in said borehole zone, in order to determine the velocity of the fluid flow above said zone and for the interval between each successive pairs of points of said plurality of spaced points and to determine from the fluid flow velocities the amount of water flowing into the borehole at points above each of said first locations.

(References on following page)

References Cited in the file of this patent

UNITED STATES PATENTS

| | | |
|---|---|---|
| 2,335,409 | Hare | Nov. 30, 1943 |
| 2,463,733 | Albaugh | Mar. 8, 1949 |
| 2,599,975 | Carpenter | June 10, 1952 |
| 2,631,242 | Metcalf | Mar. 10, 1953 |
| 2,640,936 | Pajes | June 2, 1953 |
| 2,659,046 | Arps | Nov. 10, 1953 |
| 2,674,877 | Silverman | Apr. 13, 1954 |
| 2,744,199 | Juterbock et al. | May 1, 1956 |
| 2,813,980 | De Witte | Nov. 19, 1957 |
| 2,826,699 | Hull | Mar. 11, 1958 |
| 2,841,713 | Howard | July 1, 1958 |
| 2,868,506 | Nestle | Jan. 13, 1959 |
| 2,943,197 | De Witte | June 28, 1960 |
| 2,965,753 | Reynolds et al. | Dec. 20, 1960 |
| 2,988,640 | Steel | June 13, 1961 |
| 3,037,115 | De Witte | May 29, 1962 |
| 3,084,250 | Dennis | Apr. 2, 1963 |